(12) United States Patent
Van Garsse

(10) Patent No.: US 11,946,804 B2
(45) Date of Patent: Apr. 2, 2024

(54) METHOD OF FAST SPECTRAL COLOR MEASURING

(71) Applicant: AGFA NV, Mortsel (BE)

(72) Inventor: Joris Van Garsse, Mortsel (BE)

(73) Assignee: Agfa NV, Mortsel (BE)

( * ) Notice: Subject to any disclaimer, the term of this patent is extended or adjusted under 35 U.S.C. 154(b) by 457 days.

(21) Appl. No.: 17/284,001

(22) PCT Filed: Oct. 16, 2019

(86) PCT No.: PCT/EP2019/078051
§ 371 (c)(1),
(2) Date: Apr. 9, 2021

(87) PCT Pub. No.: WO2020/079057
PCT Pub. Date: Apr. 23, 2020

(65) Prior Publication Data
US 2021/0348965 A1 Nov. 11, 2021

(30) Foreign Application Priority Data
Oct. 17, 2018 (EP) .................................. 18200921

(51) Int. Cl.
*G01J 3/50* (2006.01)
*G01J 3/02* (2006.01)
(Continued)

(52) U.S. Cl.
CPC .............. *G01J 3/027* (2013.01); *G01J 3/462* (2013.01); *G01J 3/50* (2013.01); *H04N 1/6061* (2013.01); *H04N 1/6066* (2013.01)

(58) Field of Classification Search
CPC ........ H04N 1/6066; H04N 1/6061; G01J 3/46
See application file for complete search history.

(56) References Cited

U.S. PATENT DOCUMENTS

2003/0063275 A1 4/2003 Hubble, III et al.
2005/0237545 A1 10/2005 Boll
(Continued)

FOREIGN PATENT DOCUMENTS

EP 0 611 231 A1 8/1994
EP 2672712 A1 * 12/2013 ............... H04N 9/64
(Continued)

OTHER PUBLICATIONS

International Search Report dated Jan. 22, 2020 relating to PCT/EP2019/078051, 4 pages.
(Continued)

*Primary Examiner* — Maurice C Smith
(74) *Attorney, Agent, or Firm* — Leydig, Voit & Mayer, Ltd.

(57) ABSTRACT

Method of color measuring a color of a rendered copy of a digital image, by a color-measuring-device (3000) for color measuring in a plurality of spectral ranges ($r_1 \ldots r_Q$); wherein said method comprises the step: measuring said color is measured in a sub-set ($s_1 \ldots s_M$; 3305) of said plurality of spectral ranges ($r_1 \ldots r_Q$); and wherein said sub-set ($s_1 \ldots s_M$) is determined by: selecting a color of a gamut boundary of said digital image (1200); and determining of said color for said plurality of spectral ranges ($r_1 \ldots r_Q$) corresponding spectral reflectance factors ($v_1 \ldots v_Q$); and adding a spectral range ($r_i$), having a minimum and maximum spectral reflectance factor, to said sub-set ($s_1 \ldots s_M$) wherein its corresponding spectral reflectance value ($v_i$) is larger than 10% of said maximum spectral reflectance factor minus said minimum spectral reflectance factor.

14 Claims, 4 Drawing Sheets

(51) Int. Cl.
  *G01J 3/46* (2006.01)
  *H04N 1/60* (2006.01)

(56) References Cited

U.S. PATENT DOCUMENTS

2011/0299128 A1  12/2011  Mestha et al.
2013/0127946 A1   5/2013  Kanai
2017/0134617 A1   5/2017  Hayashi et al.

FOREIGN PATENT DOCUMENTS

WO   WO-2006121776 A1 * 11/2006  ............. B05D 5/005
WO   WO-2020079038 A1 *  4/2020  ............... B44C 5/04

OTHER PUBLICATIONS

Written Opinion dated Jan. 22, 2020 relating to PCT/EP2019/078051, 7 pages.
Dianat, Sohail et al., Dynamic Optimization Algorithm for Generating Inverse Printer Map with Reduced Measurements, published in the proceedings of IEEE Int. Conference on Acoustics, Speech, and Signal Processing, May 14-19, 2006, Toulouse, France, 6 pages.

* cited by examiner

METHOD OF FAST SPECTRAL COLOR MEASURING

REFERENCE TO RELATED APPLICATIONS

This application is a 371 National Stage Application of PCT/EP2019/078051, filed Oct. 16, 2019, which claims the benefit of European Application No. 18200921.7, filed Oct. 17, 2018, the contents of which are incorporated by reference herein in their entirety.

TECHNICAL FIELD

The present invention is related to a method of spectral color measuring a rendered copy of a digital image, especially while rendering said copy.

BACKGROUND ART

Color spectrophotometers are devices to capture and to evaluate color in the visual spectrum. They are useful in the communication on colors such as brand owners and designers and useful in monitoring color accuracy throughout production.

A measurement of a color by said color spectrophotometer is a spectral reflectance curve within said visible spectrum, which is around the range of 380 nm violet to 780 nm (red). One color measurement are reported to software through an interface within a certain measurement cycle. Said spectrophotometer typically comprises one or more sensors for measuring a color in a plurality of spectral ranges. Thus, not all spectral reflectance factors of a color in a visible spectrum are measured, the reporting of a spectral reflectance curve is typically in intervals of 20 nm or 10 nm. So said spectral reflectance curve is a look-up-table with as input a spectral range and as output a spectral reflectance factor.

Said color spectrophotometers are used in the graphic arts while rendering digital images on a printing device, also called spectra color measuring on-the-fly, wherein measurements of rendered copies and/or analytics on said measurements are reported to the operator of the rendering device for guaranteeing color consistency and for ensuring that said rendered copies meet ISO, G7 or client-specific standards. Said guarantee increases productivity by lowering ink and paper consumption, significantly reduces make-ready time and improves communication between prepress operator, quality management and print buyers.

SUMMARY OF INVENTION

The rendering speed of printing device becomes nowadays faster so there is need to speed up the measurement cycle of color spectrophotometers without losing quality when reporting a spectral reflectance curve of a measurement. To ensure color consistency also more measurements on the rendered digital images are needed for having better analytics; wherein a faster measurement cycle is needed.

These problems are solved by the method of color measuring of claim 1 wherein said method measures a color, by a color-measuring-device, of a rendered copy of a digital image; and wherein said color-measuring-device comprises one or more sensors for measuring a color in a plurality of spectral ranges $(r_1 \ldots r_Q)$; and wherein said color is measured with a sub-set $(s_1 \ldots s_M)$ of said plurality of spectral ranges $(r_1 \ldots r_Q)$; and wherein said sub-set $(s_1 \ldots s_M)$ is determined by:

selecting a color of a gamut-boundary of said digital image; and determining of said color for said plurality of spectral ranges $(r_1 \ldots r_Q)$ corresponding spectral reflectance factors $(v_1 \ldots v_Q)$; and adding a spectral range $(r_i)$, having a minimum and maximum spectral reflectance factor, to said sub-set $(s1 \ldots s_M)$ wherein its corresponding spectral reflectance value $(v_i)$ is larger than 10% of said maximum spectral reflectance factor minus said minimum spectral reflectance factor.

Said color-measuring-device is for instance a color spectrophotometer, preferably an inline-color-measuring-device for measuring colors of rendered copies of digital images while rendering said digital images.

By using only a sub-set $(s_1 \ldots s_M, M<Q)$ of the plurality of spectral ranges $(r_1 \ldots r_Q)$ while measuring a color of a digital image and wherein said sub-set depends on the colors of said digital image, the measurement cycle is faster and memory consumption for reporting is smaller.

By shortening the measurement cycle, the color-measuring-device is capable of following the speed of rendering copies of said digital image thanks to the high throughput color measuring method of the present invention.

The adding of a spectral range $(r_i)$ depends in the present invention on a certain condition of said selected color of said digital image, namely if:

$$v_i > b\% \times (\max_i - \min_i)$$

wherein b is in the present invention 10; $v_i$ is the corresponding spectral reflectance factor in said spectral range $(r_i)$ of said color; and $\max_i / \min_i$ is the maximum/minimum spectral reflectance factor of said spectral range $(r_i)$.

Preferably, more than one colors are selected and the sub-set is determined by said determination-step and said adding-step for each of said selected colors. If the sub-set is still too large e.g. for following the rendering speed, the b-value may be enlarged so the number of spectral ranges in said sub-set lowers. In the present invention, b is preferably 20 and more preferably 30. A color may also be selected of said digital image itself because it is part of the gamut boundary of said digital image.

The present invention ensures that redundant or less important information in said reporting of spectral reflectance curve is not used for further analytics for color consistency in a rendering device.

The following three preferred embodiments are related to the selection of said color within said gamut boundary, wherein the sub-set can be limited without losing quality when reporting a spectral reflectance curve of a measurement. By said specific selection, the b-value of previous formula may also be enlarged so the sub-set shall be limited even more.

In a first preferred embodiment said selected color is determined by:

a) determining an image-gamut, in a N-dimensional device independent color system (ND-DIGS, N>1), of said digital image; wherein said image-gamut comprises color values of said digital image; and b) determining a skeleton of said image-gamut wherein said skeleton comprises a plurality of points which are determined by:

b1) selecting a luminance-range for color values in said N-dimensional device independent color system; and b2) determining a sub-image-gamut of said image-gamut; wherein said sub-image-gamut corresponds to said luminance-range and comprises color values which have a luminance in said corresponding luminance range; and determining a color value in said sub-image-gamut as a point of said skeleton; and wherein said selected color has a color value with a minimum color difference between said color value and said skeleton is smaller than 3 $\Delta E_{CIELAB,94}$, preferably said selected color has a color value on said skeleton. The selected color is thus determined nearby said skeleton. Further preferred embodiments of it are disclosed further on.

Said step b1 and b2 may in the present invention also:
selecting a range, along a determined axis in said N-dimensional device independent color system; and
determining a sub-image-gamut of said image-gamut; wherein said sub-image-gamut comprises color values whereof a projection towards said determined axis belongs to said range. An axis is hereby a straight line determined in said ND-DIGS, which may be an axis of the coordinate system of said ND-DIGS. Said axis is preferably determined as a straight line that substantially defines a line of symmetry of said image-gamut (200) or is oriented substantially parallel along said image-gamut.

In a second preferred embodiment said selected color is determined by
a) determining an image-gamut, in a N-dimensional device independent color system (N>1), of said digital image; wherein said image-gamut comprises color values of said digital image; and
b) thinning said image-gamut to a skeleton; and
wherein said selected color has a color value with a minimum color difference between said color value and said skeleton smaller than 3 $\Delta E_{CIELAB,94}$, preferably said selected color has a color value on said skeleton. The selected color is thus determined nearby said skeleton. Further preferred embodiments of it are disclosed further on.

In a third preferred embodiment said selected color is determined by:
a) determining an image-gamut, in a N-dimensional device independent color system (N>1), of said digital image; wherein said image-gamut comprises color values of said digital image; and
b) clustering color values in said image-gamut into K clusters by K-means clustering;
c) selecting a cluster of said K-clusters;
and wherein said selected color has a color value with a color difference between said color value and a centroid of said selected cluster smaller than 3 $\Delta E_{CIELAB,94}$, preferably said selected color is said centroid. The selected color is thus determined nearby said centroid. k-means clustering is a method of vector quantization, originally of signal processing, that is popular for cluster analysis in data mining.

The present invention is also color-measuring-device, which comprises one or more sensors for measuring a color in a plurality of spectral ranges ($r_1 \ldots r_P$) comprising means to execute the steps of the method of claim 1.

The present invention is useful when measuring colors of an oligochromatic pattern, such as a wood pattern, especially useful in the manufacturing of decorative panels for color controlling color acceptance of a decorative panel, which comprises such oligochromatic pattern.

The present invention is useful for, and preferably part of, scanning a rendered copy of a digital image by said color measuring device to get a color spectral scan, which is a digital image representing said rendered copy. Said color spectral scan comprises a plurality of pixels having color defined by said sub-set ($s_1 \ldots s_M$). Said color measuring device is than suitable to be a color spectral scanner. Less memory is needed for said scan because a limited spectral reflectance factors are stored per pixel, than when the plurality of spectral ranges of said color-measuring-device is used. Hereby are analytics on said scan and subsequent scans of subsequent rendered copies of said digital image much faster.

BRIEF DESCRIPTION OF DRAWINGS

The figures from 1 to 6 are illustrations for the present invention; defined in CIEXYZ (950), as ND-DIGS (N-dimensional independent color system), with the axes X (900); axes Y (901) and axes Z (902). The Y-coordinates in said ND-DISC is a value for luminance of a color value.

FIG. 3 shows also a color value, which is determined in said sub-image-gamut (250); and which is here a balance point (300), illustrated as a filled black circle.

FIG. 2; and FIG. 3.

DESCRIPTION OF EMBODIMENTS

Figure 1:
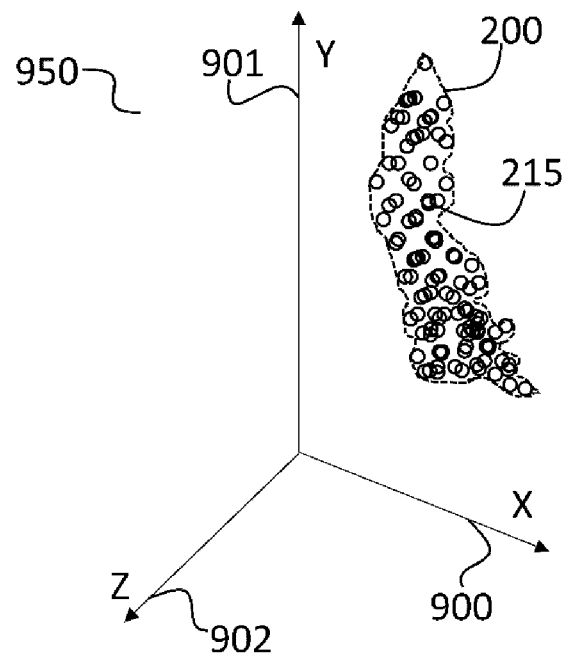
FIG. 1 illustrates an image-gamut (201) of an oligochromatic pattern; comprising a plurality of color values (215) which are illustrated as open circles.
Figure 2:
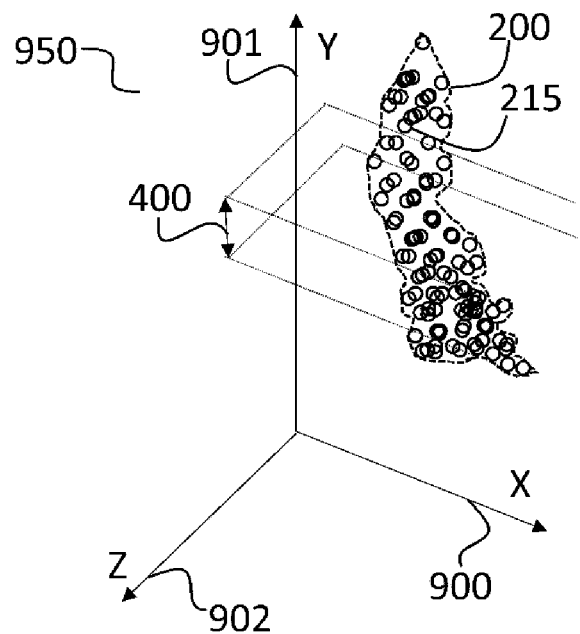
FIG. 2 shows a luminance range (400), illustrated as two parallel planes, is selected for the oligochromatic pattern of FIG. 1.
Figure 3:
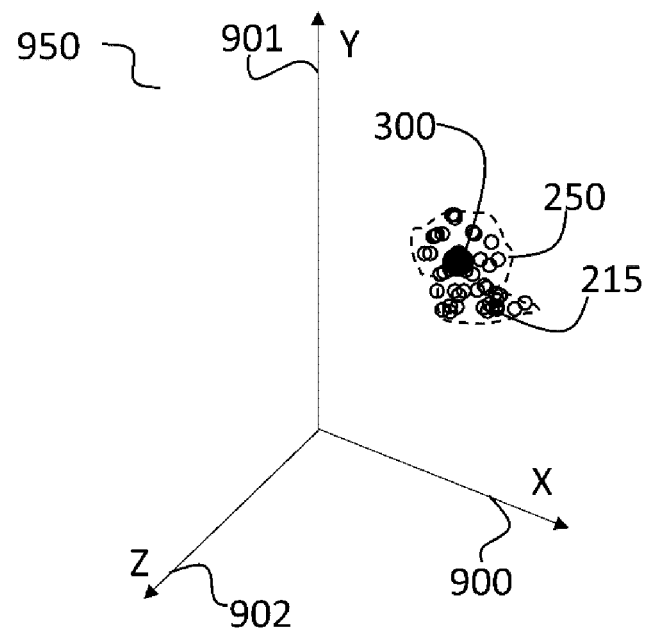
FIG. 3 shows a sub-image-gamut (250), between said two parallel planes of FIG. 2 (not visible), which is determined
Figure 4:
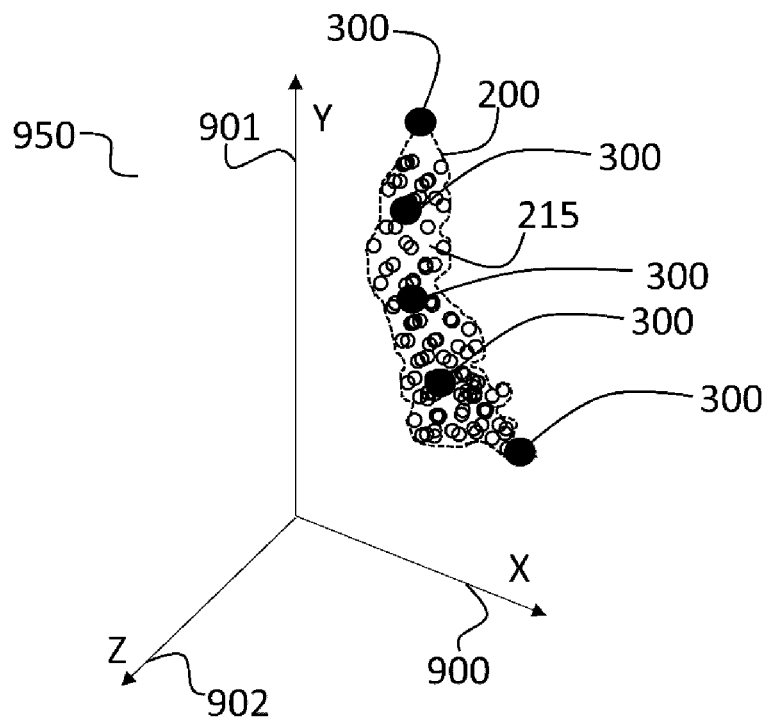
FIG. 4 shows the result of selecting 5 luminance-ranges and determination of 5 balance points (300) in the determined 5 sub-image-gamuts in an image-gamut (201) of the same oligochromatic pattern as FIG. 1.
Figure 5:
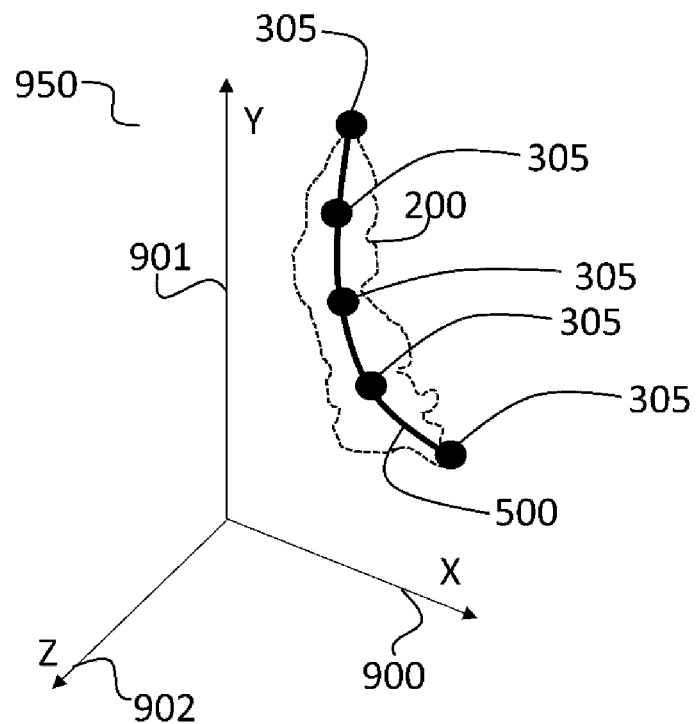
FIG. 5 shows the skeleton (500) of said image-gamut (200) with a plurality of skeleton points (305); wherein said skeleton points are the balance points of FIG. 4.
Figure 6:
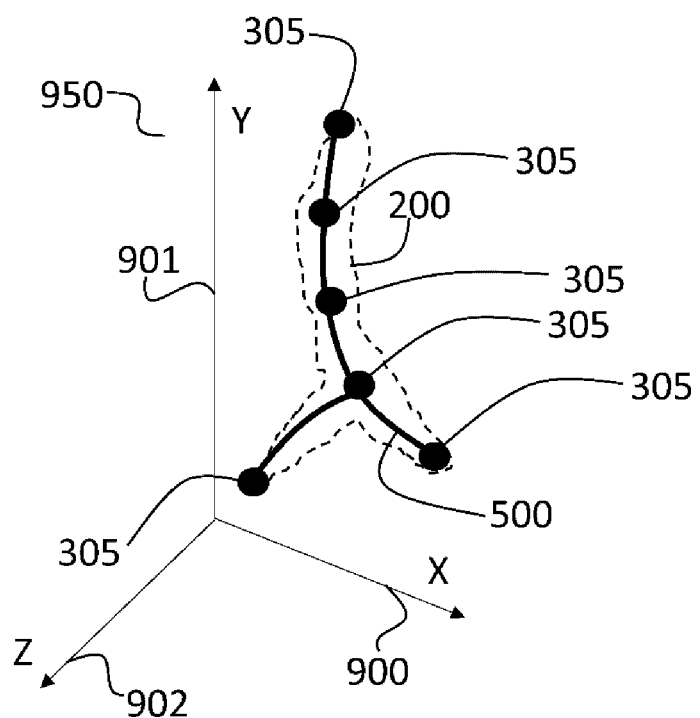
FIG. 6 shows a skeleton (500) of an image-gamut (200) of another oligochromatic pattern as in the previous figures. The skeleton (500) is determined according the present invention and shows hereby a skeleton (500) comprising a cross point in its skeleton points (305).

A digital image comprises a plurality of pixels wherein said pixel has a color value. An image-gamut of said digital image is a collection of said color values. It may have a boundary, which is a volume wherein said color values belong. A sub-image-gamut is a part of said image-gamut, which may have a boundary. An image-gamut is a particular collection of color values in a ND-DIGS. A boundary is a specific region of a ND-DIGS. ND is the abbreviation of 'N-dimensional', wherein N is an integer larger than one and which is preferably three in the present invention and then abbreviated as 3D for 'three-dimensional'. A DIGS is the abbreviation of device independent color system, such as CIELAB, CIELUV, CIELCH or CIEXYZ. A DIGS is sometimes also called a color space. A DDCS is the abbreviation of device dependent color system, such as CMYK or comprising tristimulus values of three primary colored lights in a TV tube. A DDCS is sometimes called a colorant space.

Color Spectrophotometer

There are several types of color spectrophotometers. A selection depends on application, desired functionality, and portability. Color spectrophotometers come in a range of sizes, of portable devices to large benchtop instruments. They comprises one or more sensors for measuring a color in a plurality of spectral ranges ($r_1 \ldots r_Q$). The most common color spectrophotometer measures light with a certain lightning condition reflected at a fixed angle to the color, usually 45°. Said light comes preferably for a built-in light source. A light source may be a LED or bulb lamp. Other types are spherical spectrophotometers and multi-angle spectrophotometers. Examples of such lightning conditions for color measuring are CIE D50 or CIE D65 of 'International Commission on Illumination'. A lightning condition is typically known by its spectral power distributions.

The connection of a color-measuring-device to a data processing apparatus for gathering color measurements may be performed by a linkage via a network, such as a LAN (=local area network). The color measurements may be stored in the memory accessible by said data processing apparatus:

The present invention adapted a spectrophotometer to measure colors only with a sub-set ($s_1 \ldots s_M$) of its plurality of spectral ranges ($r_1 \ldots r_Q$) wherein said sub-set is determined by the digital image that a rendered copy represents. The spectrophotometer comprised or is linked to a control unit which stores said digital image in a memory. From said memory a gamut boundary of said digital image may be determined for selecting said color or a color is selected from said memory. From said color a spectral range ($r_i$) is determined according a certain condition to become part of said sub-set. The other spectral ranges, which does not belong to said sub-set, are not used in the color measurements for example by switching off a sensor of said color-measuring-device. Said determination of a sub-set may be performed before the rendering for example when a print job comprising said digital image is entered in a print queue for rendering. Said print queue is preferably part of a prepress workflow system comprising one or more raster image processors (RIP's). The determined sub-set is than adapted according said print job at the time said print job is rendered.

The determination of spectral reflectance factors ($v_1 \ldots v_Q$) of said selected color, wherein said factors corresponds to said plurality of spectral ranges ($r_1 \ldots r_Q$) corresponding spectral reflectance factors ($v_1 \ldots v_Q$) may comprising color conversion methods for example RGB, if the digital image is defined in colorant space RGB (red, green, blue) to spectral reflectance factors for example by color conversion models. A color conversion model is a mathematical relation that expresses color values of an ND-DIGS, such as CIELAB to a colorant gamut of an input/rendering device and vice-versa. Said plurality of spectral ranges is for example an ND-DIGS, wherein N equals Q. Said models are using mainly LUT's (Look-Up-Tables) and interpolation techniques. A well-known way of defining said LUT's is the one that are defined by International Color Consortium (ICC); in his Specification ICC. 1:2001-12 "File Format For Color Profiles".

For measuring a color, a light source is used on said color while measuring. In a preferred embodiment the color-measuring-device, comprises one or more light sources for lightning a color by a plurality of lightning conditions and wherein a color is measured under said plurality of lightning conditions for reporting a spectral reflectance curves with said lightning condition. Said report under said lightning condition is useful for metamerism analytics on said color measurement. By the shortened measurement cycle in the present invention, said extra color measurements becomes possible within the time of the present state-of-the-art measurement cycle.

The color-measuring-device of the present invention may be comprised in a frame-scan camera for scanning a part or whole the digital image or may be comprised in a line-scan camera for scanning line per line.

For line scan technology, high speed image capturing is needed, especially in continuous web applications. With the present invention of high throughput spectral color measuring, it is an advantage that said method is performed by said line-scan camera, whether or not with optics, for capturing a rendered copy of a digital image in a ND-DIGS, defined by said determined sub-set of spectral ranges. The captured rendered copy is called a scan; which may be compared with previous scans of other rendered copies of said digital image.

Oligochromatic Pattern

The digital image in the present invention is preferably an oligochromatic pattern; which is a decorative pattern with a few (=oligo, ὀλίγο) colors (chromatic, χρῶμα). An oligochromatic pattern is formed by color shade combinations of minimum two and maximum eight dominant color values but mainly maximum five dominant color values. Thus not less than two because it should than be a monochromatic pattern and not more than eight because it should than be a polychromatic pattern, which comprises also multiple objects instead of maximum 8 objects in such oligochromatic pattern.

Such oligochromatic pattern is preferably in the present invention a wood pattern. A wood pattern has a tone, a contrast color, wood grain lines and sometimes wood pores and/or wood imperfections such as knot and cracks. Said wood grain lines are typically elongated in a dominant direction, called the nerve direction and between these wood grain lines the tone of the wood image is determined. The elongated wood grain lines are lines repeated with variances in frequency on top of said tone.

It is found that when skeletonizing the image gamut of such oligochromatic pattern that selecting points near said skeleton or on said skeleton, is advantage for optimizing the sub-set.

Manufacturing Decorative Panels

Said oligochromatic pattern is preferably used for rendering on a substrate, more preferably for forming a decorative layer wherein said pattern is rendered on a substrate, such as deco-paper. Said decorative layer may than be used for manufacturing decorative panels mainly used as decorative flooring, decorative wall. Said decorative layer includes a thermosetting resin impregnated deco-paper, which is than assembled with one or more core layer in a heat press to form a decorative panel. A core layer is preferably a board material composed substantially of wood fibres but also a synthetic core layer may be used. A deco-paper is preferably a paper with a porosity according to Gurley's method (DIN 53120) between 8 and 20 seconds. Suitable paper sheets having high porosity and their manufacturing are also disclosed by U.S. Pat. No. 6,709,764 (ARJO WIGGINS). Due to said porosity, color mapping with the use of the skeleton of the present invention it has been found that it has a high accuracy without the existence of tone jumps or color jumps after the color mapping.

The present invention is preferably part of said manufacturing of decorative panels for color control of a decorative layer and/or decorative panel or for color acceptance calculation of a decorative panel.

Skeleton

A skeleton is a narrowed version of an ND-object in an ND-space. In the present invention is said ND-object an image-gamut of a digital image. A skeleton in said ND-space comprises ND-points, preferably 3D-points forming a wire or multiple wires with linked or connected ND-points. The skeleton forms between said linked ND-points preferably one path or a path with a set of side paths. Two of said ND-points are linked or connect together by a sub-path. A path is a sequence of minimal one such sub-paths. If the digital image is an oligochromatic pattern than the skeleton has maximum 8 side path. If it is a wood pattern than it is found that the skeleton has maximum 2 side paths but mostly no side paths.

A sub-path may be a straight line but also a curve defined as a ND-function between ND-points such as a polygon, Bezier curve or a parametric equation. The linked or connected sub-paths that forms said skeleton are not necessary defined by the same ND-function. A ND-point is preferably defined as a point with N coordinate values as used in a Cartesian coordinate system. A polar coordinate system may also be used. A skeleton maybe a medial axis of said ND-object.

In a preferred embodiment using a skeleton; said skeleton has an end point; and said selected color has a color value with a minimum color difference between said color value and said end point of said skeleton smaller than 3 $\Delta E_{CIELAB,94}$, preferably said selected color is said end point The selected color is thus determined nearby said end point.

In another preferred embodiment using a skeleton; said skeleton has a cross point; and wherein said selected color has a color value with a minimum color difference between said color value and said cross point of said skeleton smaller than 3 $\Delta E_{CIELAB,94}$, preferably said selected color is said cross point The selected color is thus determined nearby said cross point.

In another preferred embodiment using a skeleton; said skeleton has an inflection point; and
wherein said selected color has a color value with a minimum color difference between said color value and said inflection point of said skeleton smaller than 3 $\Delta E_{CIELAB,94}$, preferably said selected color is said inflection point The selected color is thus determined nearby said inflection point.

Using said selected color nearby said end point or cross point or inflection point determines a good sub-set without losing quality when reporting a spectral reflectance curve of a measurement but resulting in fast reporting with a short measurement cycle.

In a preferred embodiment said selected color of the present invention is determined by:
 a) determining an image-gamut, in a N-dimensional device independent color system (ND-DIGS, N>1), of said digital image; wherein said image-gamut comprises color values of said digital image; and
 b) determining a skeleton of said image-gamut wherein said skeleton comprises a plurality of points which are determined by:
  selecting a luminance-range for color values in said N-dimensional device independent color system; and
  determining a sub-image-gamut of said image-gamut; wherein said sub-image-gamut corresponds to said luminance-range and comprises color values which have a luminance in said corresponding luminance range; and
  determining a color value in said sub-image-gamut as a point of said skeleton; and
 wherein said selected color has a color value with a minimum color difference between said color value and said skeleton is smaller than 3 $\Delta E_{CIELAB,94}$, preferably said selected color has a color value on said skeleton. The selected color is thus determined nearby said skeleton.

Said determined color value is preferably a balance point of said sub-image-gamut and more preferably a centroid of said sub-image-gamut.

In another preferred embodiment said selected color is determined by
 a) determining an image-gamut, in a N-dimensional device independent color system (N>1), of said digital image; wherein said image-gamut comprises color values of said digital image; and
 b) thinning said image-gamut to a skeleton; and
 wherein said selected color has a color value with a minimum color difference between said color value and said skeleton smaller than 3 $\Delta E_{CIELAB,94}$, preferably said selected color has a color value on said skeleton. The selected color is thus determined nearby said skeleton.

Said image-gamut of the digital pattern can be thinned to connected N-dimensional points, also called ND-points. Thinning algorithms are well-known. Some of them are disclosed in Chapter 9 of "Algorithms for Graphics and Image Processing", by Theo Pavlidis, ISBN 0-914864-65-X, published by Computer Science Press, 1982.

Balance Point of a Collection of ND-Points

A balance point of a collection of ND-points is a point that fulfills a predetermined condition based on said collection of ND-points. For example a balance point may be a centroid of said collection of ND-points; it may be an average of said collection of ND-points or it may be a weighted average of said collection of ND-points.

Hereby, as example, several conditions for determining a balance point of a collection of w 3D-points ($p_1$, $p_2$, $p_3$, ... $p_w$) wherein $p_i$ has three coordinates $\{a_i, b_i, c_i\}$ with $i=1$ ... w:

$$p_{balance} = (\text{average}(a_i); \text{average}(b_i); \text{average}(c_i)) \quad \text{with } i=1 \ldots w; \text{ or}$$

$$p_{balance} = \{(\Sigma q_a \times a_i + r_a)/w; \; \Sigma q_b \times b_i + r_b)/w; \; \Sigma q_c \times c_i + r_c)/w\} \text{ with } i=1 \ldots w \text{ and } q_a; r_a; q_b; r_b; q_c; \text{ and } r_c \text{ as weight factors.}$$

Said collection of ND-points forms a boundary in an ND-space. Of said boundary; which is an ND-object; a centroid (as predetermined condition) may be determined; which may than be a balance point of said collection of ND-points. Determination of a centroid of a boundary or a collection of ND-points is well-known in mathematics. It is sometimes called geometric center.

Luminance-Factor/Lightness

Luminance-factor a photometric measure of the luminous intensity. It describes the amount of light that passes through, is emitted or reflected of a particular area.

In the present invention the luminance range consists of a minimum luminance-factor and a maximum luminance-factor; wherein the minimum luminance-factor and maximum luminance-factor may be equal to each other.

In a preferred embodiment, a plurality of luminance ranges are selected that succeeds, preferably succeeds equidistant, each other for having an accurate skeleton (500) of the image-gamut (200).

A determination of luminance-factor of a color value in a ND-DIGS is well-known by a skilled person. For CIELAB as ND-DIGS the L*-value is a measure of lightness, thus luminance-factor, of a color value. Conversion models and/or mathematical functions between ND-DIGS are also known by said skilled person.

Of a color value in a ND-DIGS also chrominance (chroma), hue and saturation can be calculated by conversion models and/or mathematical functions.

Rendering Device

A rendering device is hereby an apparatus for reproduction of digital images and/or text such as a display or an inkjet printer. Examples of rendering devices that are used to reproduce an image are CRT's, LCD's, plasma display panels (PDP), electroluminescent displays (ELD), carbon nanotubes, quantum dot displays, laser TV's, Electronic paper, E ink, projection displays, conventional photography, electrophotography, dot matrix printers, thermal transfer printers, dye sublimation printers and inkjet systems to name a few.

A rendering device has a certain colorant gamut, such as RGB (Red, Green, Blue) or CMYK (Cyan Magenta, Yellow, Black), which determines the colorants that can be used for reproduction an image on said rendering device. It is found for the reproduction of wood patterns that an rendering device is preferably CRYK (Cyan, Red, Yellow and Black) or CRY (Cyan, Red and Yellow) because said colorant gamut generates a color space that is broad enough for rendering wood patterns.

Said rendering device is capable of rendering a plurality of color values, defined in a ND-DIGS. Said color values are collected in an output-device-gamut of said rendering device. Said output-device-gamut may have a boundary, which is a volume wherein said color values belong. The larger said output-device-gamut, the more colors can be reproduced.

In a preferred embodiment is said rendering device a single pass inkjet printing device, which preferably renders at a speed higher than 70 meters per minute. The present invention is an advantage for said printing device because it enables high throughput color measuring while rendering.

EXAMPLE

Figure 7:
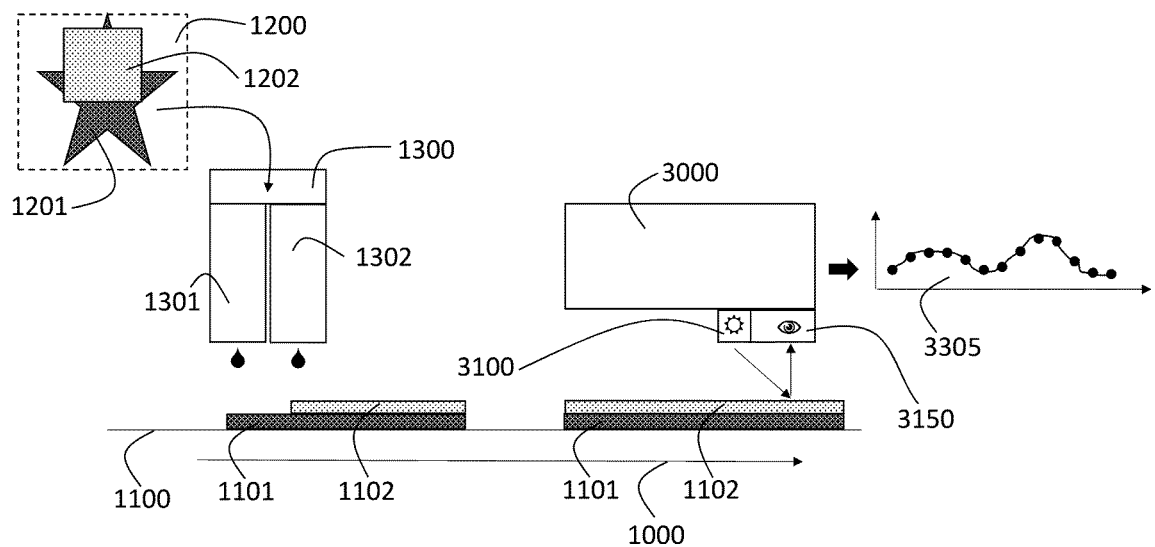
FIG. 7 shows prior-art how rendered copies are measured with an spectrophotometer (3000), positioned inline a rendering device.

FIG. 7 shows an example wherein a spectrophotometer (3000) is used in a rendering device for measuring rendered copies as known by the skilled person. A digital image (1200), comprising two color channels (1201, 1202) is rendered on a rendering device comprising two inkjet heads (1301, 1302) wherein the first color channel (1201) is transmitted via a controller (1300) to said first inkjet head (1302) and said second color channel (1202) is transmitted via said controller (1300) to said second inkjet printhead. Droplets form a first and second ink layer (1102) by said transmissions while passing (1000) a substrate (1100) underneath said inkjet printheads (1301, 1302).

A rendered copy is measured by said spectrophotometer (3000), having a light source (3100) and a sensor (3150) for measuring a color. Said spectrophotometer (3000) reports a spectral reflectance curve (3305) of said measurement. Said spectral reflectance curve (3305) comprises thirteen spectral reflectance factors in the visible spectrum.

Figure 8:
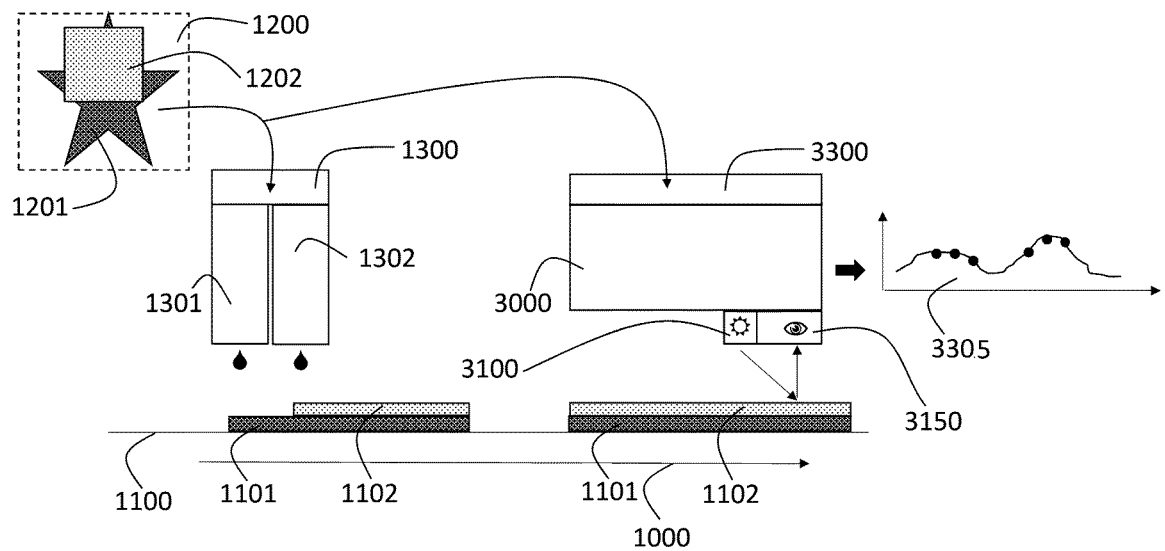
FIG. 8 shows a preferred embodiment of the present invention wherein rendered copies are measured with a spectrophotometer (3000), positioned inline a rendering device.

FIG. 8 shows an example of the present invention wherein said spectrophotometer of FIG. 7 is adapted by having another controller (3300). Said other controller (3300) receives also said digital image (1200) for analyzing said digital image to select a sub-set of spectral ranges. Said adapted spectrophotometer (3000) reports, according to said selected sub-set, a spectral reflectance curve (3300) of a measurement wherein said spectral reflectance curve (3305) comprises six spectral reflectance factors in the visible spectrum based on the analysis of said digital image (1200). Said analysis of said digital image is explained in detail in the preferred embodiments of the present invention.

REFERENCE SIGNS LIST

| | |
|---|---|
| 200 | image-gamut |
| 215 | color value |
| 250 | sub-image-gamut |
| 300 | balance point |
| 305 | point of a skeleton |
| 400 | luminance-range |
| 500 | skeleton |
| 900 | X-axes |
| 901 | Y-axes |
| 902 | Z-axes |
| 950 | CIEXYZ as ND-DICS |
| 1000 | Passing underneath printheads |
| 1100 | substrate |
| 1101 | Ink layer |
| 1102 | Ink layer |
| 1200 | Digital image |
| 1201 | Color channel |
| 1202 | Color channel |
| 1300 | Controller |
| 1301 | Inkjet printhead |
| 1302 | Inkjet printhead |
| 3000 | spectrophotometer |
| 3100 | Light source |
| 3150 | sensor |
| 3300 | controller |
| 3305 | Spectral reflectance curve |

The invention claimed is:

1. A method of color-measuring a color of a printed copy of a digital image, the digital image having a gamut boundary, the method comprising:
   measuring a color by a color-measuring-device capable of color-measuring in a plurality of spectral ranges $(r_1 \ldots r_Q)$, wherein said color is measured in a sub-set $(s_1 \ldots s_M)$ of said plurality of spectral ranges $(r_1 \ldots r_Q)$ and said sub-set $(s_1 \ldots s_M)$ is obtained by:
   selecting another color within said gamut boundary;
   determining corresponding spectral reflectance factors $(v_1 \ldots v_Q)$ of said selected other color for said plurality of spectral ranges $(r_1 \ldots r_Q)$; and
   adding a spectral range $(r_i)$ from said plurality of spectral ranges $(r_1 \ldots r_Q)$ to said sub-set $(s_1 \ldots s_M)$, wherein the corresponding spectral reflectance value $(v_i)$ of said spectral range $(r_i)$ is larger than 10% of a maximum of said added spectral range $(r_i)$ minus a minimum of said added spectral range $(r_i)$.

2. The method of color-measuring according to claim 1 further comprising determining the selected other color within the gamut boundary by:
   determining an image-gamut of said digital image in an N-dimensional device independent color system, wherein N>1 and said image-gamut comprises color values of said digital image; and determining a skeleton of said image-gamut, wherein said skeleton comprises a plurality of points which are determined by:
  selecting a luminance-range for color values in said N-dimensional device independent color system;
  determining a sub-image-gamut of said image-gamut, wherein said sub-image-gamut corresponds to said luminance-range and comprises color values which have a luminance in said corresponding luminance range; and
  determining a color value in said sub-image-gamut as a point of said skeleton;
wherein said selected other color has a color value with a minimum color difference between said color value of said skeleton that is smaller than 3 $\Delta E_{CIELAB,94}$.

3. The method of color-measuring according to claim 2 wherein the skeleton has an end point; and
the color value of the selected other color has a color difference opposite said end point that is smaller than 3 $\Delta E_{CIELAB,94}$, or the color value of the selected other color has a minimum color difference between said color value and said end point of said skeleton that is smaller than 3 $\Delta E_{CIELAB,94}$.

4. The method of color-measuring according to claim 2 wherein the skeleton has a cross point; and
the color value of the selected other color has a color difference opposite said cross point that is smaller than 3 $\Delta E_{CIELAB,94}$.

5. The method of color-measuring according to claim 2 wherein said skeleton has an inflection point; and
the color value of the selected other color has a color difference opposite said inflection point that is smaller than 3 $\Delta E_{CIELAB,94}$.

6. The method of color-measuring according to claim 1 further comprising determining said selected other color by:
determining an image-gamut of said digital image in an N-dimensional device independent color system, wherein N>1 and said image-gamut comprises color values of said digital image; and
determining a skeleton of said image-gamut wherein said skeleton comprises a plurality of points which are determined by:
  selecting a range along a determined axis in said N-dimensional device independent color system;
  determining a sub-image-gamut of said image-gamut, wherein said sub-image-gamut comprises color values whereof a projection towards said determined axis belongs to said range; and
  determining a color value in said sub-image-gamut as a point of said skeleton;
wherein said selected other color has a color value with a minimum color difference between said color value of said skeleton that is smaller than 3 $\Delta E_{CIELAB,94}$.

7. The method of color-measuring according to claim 6 wherein the skeleton has an end point; and
the color value of the selected other color has a color difference opposite said end point that is smaller than 3 $\Delta E_{CIELAB,94}$, or the color value of the selected other color has a minimum color difference between said color value and said end point of said skeleton that is smaller than 3 $\Delta E_{CIELAB,94}$.

8. The method of color-measuring according to claim 6 wherein the skeleton has a cross point; and
the color value of the selected other color has a color difference opposite said cross point that is smaller than 3 $\Delta E_{CIELAB,94}$.

9. The method of color-measuring according to claim 1 further comprising determining the selected other color by:
determining an image-gamut in a N-dimensional device independent color system of said digital image, wherein N>1 and said image-gamut comprises color values of said digital image; and
thinning said image-gamut to a skeleton;
wherein said selected other color has a color value with a color difference opposite said skeleton that is smaller than 3 $\Delta E_{CIELAB,94}$.

10. The method of color-measuring according to claim 9 wherein the skeleton has an end point; and
the color value of the selected other color has a color difference opposite said end point is smaller than 3 $\Delta E_{CIELAB,94}$, or the color value of the selected other color has a minimum color difference between said color value and said end point of said skeleton that is smaller than 3 $\Delta E_{CIELAB,94}$.

11. The method of color measuring according to claim 9 wherein the skeleton has a cross point; and
the color value of the selected other color has a color difference opposite said cross point that is smaller than 3 $\Delta E_{CIELAB,94}$.

12. The method of color-measuring according to claim 1 wherein said selected other color is determined by:
determining an image-gamut in a N-dimensional device independent color system of said digital image, wherein N>1 and said image-gamut comprises color values of said digital image;
clustering color values in said image-gamut into K clusters by K-means clustering; and
selecting a cluster of said K-clusters;
wherein said selected other color has a color value with a color difference opposite said selected cluster that is smaller than 3 $\Delta_{ECIELAB,94}$.

13. A method of color-measuring comprising:
rendering a digital image with a rendering device thereby obtaining a printed copy of said digital image; and
color measuring said printed copy of said digital image for color analysing on said rendering device, said color measuring comprising;
  measuring a color by a color-measuring-device capable of color measuring in a plurality of spectral ranges $(r_1 \ldots r_Q)$, wherein said color is measured in a sub-set $(s_1 \ldots s_M)$ of said plurality of spectral ranges $(r_1 \ldots r_Q)$ and said sub-set $(s_1 \ldots s_M)$ is obtained by:
    selecting another color within a gamut boundary of a digital image;
    determining corresponding spectral reflectance factors $(v_1 \ldots v_Q)$ of said selected other color for said plurality of spectral ranges $(r_1 \ldots r_Q)$; and
    adding a spectral range $(r_i)$ from said plurality of spectral ranges $(r_1 \ldots r_Q)$ to said sub-set $(s_1 \ldots s_M)$, wherein the corresponding spectral reflectance value $(v_i)$ of said spectral range $(r_i)$ is larger than 10% of a maximum of said added spectral range $(r_i)$ minus a minimum of said added spectral range $(r_i)$.

14. The method of color-measuring according to claim 13 wherein said digital image is an oligochromatic pattern.

* * * * *